(12) United States Patent
Bornstein et al.

(10) Patent No.: US 7,228,337 B1
(45) Date of Patent: Jun. 5, 2007

(54) METHODS AND APPARATUS FOR PROVIDING A NETWORK SERVICE TO A VIRTUAL MACHINE

(75) Inventors: David M. Bornstein, Westwood, MA (US); Stephen Jeffrey Morris, Westford, MA (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 09/950,334

(22) Filed: Sep. 11, 2001

(51) Int. Cl.
    G06F 15/16 (2006.01)
    G06F 3/00 (2006.01)
    G06F 9/44 (2006.01)
    G06F 9/46 (2006.01)
    G06F 13/00 (2006.01)

(52) U.S. Cl. ............................ 709/217; 719/319
(58) Field of Classification Search ............ 709/227, 709/238, 249; 718/104, 105, 106, 107; 719/311, 319; 370/389, 392, 395.31; 703/23–27
    See application file for complete search history.

(56) References Cited

U.S. PATENT DOCUMENTS

| | | | |
|---|---|---|---|
| 5,371,852 A * | 12/1994 | Attanasio et al. | 709/245 |
| 5,530,820 A * | 6/1996 | Onodera | 718/1 |
| 5,692,193 A * | 11/1997 | Jagannathan et al. | 718/106 |
| 5,761,507 A * | 6/1998 | Govett | 718/101 |
| 5,835,726 A | 11/1998 | Shwed et al. | 395/200.59 |
| 5,918,017 A * | 6/1999 | Attanasio et al. | 709/224 |
| 5,930,259 A * | 7/1999 | Katsube et al. | 370/409 |
| 6,185,619 B1 * | 2/2001 | Joffe et al. | 709/229 |
| 6,205,477 B1 * | 3/2001 | Johnson et al. | 709/220 |
| 6,219,786 B1 | 4/2001 | Cunningham et al. | 713/152 |
| 6,321,337 B1 | 11/2001 | Reshef et al. | 713/201 |
| 6,331,984 B1 * | 12/2001 | Luciani | 370/401 |
| 6,360,262 B1 * | 3/2002 | Guenthner et al. | 709/226 |
| 6,587,866 B1 * | 7/2003 | Modi et al. | 718/105 |
| 6,647,422 B2 * | 11/2003 | Wesinger et al. | 709/228 |
| 6,661,799 B1 * | 12/2003 | Molitor | 370/401 |
| 6,665,304 B2 * | 12/2003 | Beck et al. | 370/401 |
| 6,667,974 B1 * | 12/2003 | Shigeta | 370/389 |
| 6,667,980 B1 * | 12/2003 | Modi et al. | 370/395.32 |
| 6,735,601 B1 * | 5/2004 | Subrahmanyam | 709/224 |

(Continued)

OTHER PUBLICATIONS

McIntosh "Server-based computing:back to the future solves enterprise desktop problems", ICMIT 2000 vol. 2 pp. 732-737.*

(Continued)

*Primary Examiner*—Krisna Lim
*Assistant Examiner*—Sean Reilly
(74) *Attorney, Agent, or Firm*—BainwoodHuang

(57) ABSTRACT

In a computational device, a technique provides network communications to a virtual machine. In particular, the technique includes receiving a first communications signal having a first address and data from an external device, performing a network address translation operation based on the first communications signal to obtain a second address that identifies the virtual machine and providing a second communications signal having the second address and the data, to the virtual machine. The technique may further include using an external network Internet Protocol address and port identifier and to translate the first communications signal into an internal network Internet Protocol address by accessing an entry of a network address translation table.

24 Claims, 7 Drawing Sheets

U.S. PATENT DOCUMENTS

| | | | |
|---|---|---|---|
| 6,760,775 B1* | 7/2004 | Anerousis et al. | 709/238 |
| 6,801,949 B1* | 10/2004 | Bruck et al. | 709/232 |
| 2002/0061011 A1* | 5/2002 | Wan | 370/352 |

OTHER PUBLICATIONS

Theo Schlossnagle "Mod Backhand—Internal Explained,," John Hopkins University, Apr. 5, 2001.*

VMware web pages (Jun. 8, 2000) 7 pages—retrieved from web.archive.org May 20, 2006.*

David Desrosiers "Re: NAT for Host-only Under 2.4 Linux Kernal", Newsgroups:vmware.for-linux.configuration, May 11, 2001. (1 page)—retrieved from groups.google.com May 18, 2006.*

David Klann "NAT for Host-only Under 2.4 Linux Kernal", Newsgroups:vmware.for-linux.configuration, Mar. 31, 2001. (3 pages) retrieved from groups.google.com May 18, 2006.*

Chris Behanna "Re: Host-only networking and NAT?", Newsgroups: mpc/lists.freebsd.emulation, Aug. 1, 2000. (4 pages) retrieved from groups.google.com May 18, 2006.*

* cited by examiner

| PORT | INTERNAL DESTINATION |
|---|---|
| 25 | 23.146.27.86 |
| 80 | 23.146.101.46 |
| 110 | 23.146.29.58 |
| 300 | 23.146.8.203 |
| | |
| | |

METHODS AND APPARATUS FOR PROVIDING A NETWORK SERVICE TO A VIRTUAL MACHINE

BACKGROUND OF THE INVENTION

A general-purpose computer typically includes a processor, memory and a network interface. The computer operates an operating system software program, which is capable of performing system and user-related maintenance functions, and application software programs. Examples of conventional operating systems include UNIX®, VMS® and Windows®. Application software programs may be limited with respect to the operating systems with which they can operate because the software manufacturer has made a decision to support certain programs only on certain operating systems.

Some computers run specialized applications called virtual machine applications. A typical virtual machine application runs in the computer's operating system environment and simulates the operation of one or more entire computers. For example, a computer can run the Linux® operating system. A virtual machine application that provides a Windows®2000 environment can then run on the Linux® operating system. Windows® 2000 executables can then run in the Windows 2000® environment running on the Linux® operating system.

A virtual machine application which is similar to the virtual machine application described above is VMware™ which is provided by VMware™, Inc. of Palo Alto, Calif.

SUMMARY OF THE INVENTION

Unfortunately, there are deficiencies with some of the conventional techniques used to run applications on computers. Because specific application software programs may require a specific operating system to operate, users may have to purchase and maintain additional computer systems with the right operating system, in order to accommodate desired programs. This problem is not uncommon in the case of content provision software, used to manage and provide content to users. The programs may be programmed for use with a different operating system than what a user already has available with the consequence of forcing the implementation of a new computer and operating system. The problem is also likely to require more equipment, set-up and implementation procedures as well as other associated maintenance expenses, etc. It may require the expense of an additional IP (Internet Protocol) address or addresses. The costs involved with maintaining an additional system or systems may be significant, not to mention the increase in complexity resulting from implementation of additional systems.

In addition, users needing the services of an application software program using a different operating system than that which the users have familiarity, are faced with the technical challenge of supporting the additional operating system software as well as the application software. It can be a daunting challenge. There may not be a simple way to add an additional operating system environment for a desired application that requires one.

Another problem with conventional techniques is that transmitting content, from where the content is located on more than one different computer, may require multiple requests and can be a slow process. That is, after receiving requested content from a content provider as a result of an initial request, a requesting user's computer may initiate an additional request or requests over the network. The additional content requested might be files that are used to finish web pages, for example, such as pictures, other multi-media, etc. located on a different server. Such additional requests and transmissions result in an increase of transmission time.

In contrast, the invention is directed to techniques for providing network access to computers that operate virtual machines. In particular, an embodiment of the invention provides a method for executing virtual computer systems capable of executing different application programs on a single computer system. Programs co-exist with other programs while permitting communications with external devices. This arrangement can reduce system requirements. The arrangement, in turn, reduces maintenance, support, set-up, and other system related expenses. Embodiments of the invention make it feasible to use a single IP address rather than incur the expense of providing individual IP addresses for multiple computers. For example, an embodiment of the invention can provide a virtual machine with a Linux® operating system running a web server used to provide HTML and other web page content and a second virtual machine with a Windows NT® operating system running Microsoft® Media Server software for providing multimedia content. Finally, a user can also run multiple versions of the same application in more than one virtual machine to improve application-processing performance. Incoming requests are distributed to the various versions of the application program to spread out processing between the instances of the application program.

An additional benefit in the form of increased speed of transmission of content is possible. Instead of the user system making a second request over a network for content that must also be returned over the network, the content can be obtained directly from the same computer system. In the example above, after an initial user request to a computer system providing an HTML page, additional content could be obtained directly from the Microsoft® Media Server software located on the same computer and returned directly to the user thereby significantly reducing the time of transmission of the request and the content over the network.

One convenient use for an embodiment of the invention is to provide a different operating system environment in order to accommodate application programs requiring new operating systems. This can reduce the technical knowledge requirements for supporting a new operating system environment. One method of implementation is to pre-packaged the computer system with system parameters and an operating system in order to simplify installation of an application program requiring a new operating system.

According to one embodiment of the invention, a desired application program is hosted on an operating system running within a virtual machine. A typical method for providing the virtual machine capability is to use a software packages such as VMware™, a commercial software program used to emulate one or more subordinate computers capable of executing application programs. For example, VMware™ runs on a computer system using a native Linux® operating system. In turn, the virtual computer environment running within the VMware™ program can be set up to provide a Windows NT® operating system. Then Microsoft Windows Media® Technology server can be executed within the Windows NT® operating system. Other programs can also be used to provide the virtual machine environment such as a Java® virtual machine.

In order to communicate between software applications being executed within one or more virtual machines and an outside location, the network traffic is intercepted and network addresses are translated. This is accomplished by a second program, also running on the native operating system of the computer system (along with the virtual machine program). The program accepts requests from the outside source and translates them using an associated port identifier to an internal IP address supported by one of the virtual machine programs. An example of one program that is capable of performing such translation is the ipchains program of the Linux® operating system. Data can then be provided to the virtual machine using the translated address.

Another embodiment of the invention, within a computational device running a virtual machine, is a method for providing a network service to the virtual machine, the method comprising the steps of receiving a first message from an external device, the first message having a first address and data, performing a network address translation operation based on the first message to obtain a second address that identifies the virtual machine, and providing, to the virtual machine, a second message having the second address and the data.

In another embodiment of the invention the computational device connects with the external device through an external network, wherein the first address is an external network Internet Protocol address, wherein the virtual machine resides in an internal network within the computational device, wherein the second address is an internal network Internet Protocol address, and wherein the step of performing includes the step of conducting a network address translation routine to convert the external network Internet Protocol address to the internal network Internet Protocol address.

In still another embodiment, the computational device includes a network address translation table, wherein the first message further includes a port identifier, and wherein the step of conducting includes the step of accessing an entry of the network address translation table based on the port identifier of the first message in order to obtain the internal network Internet Protocol address.

In another embodiment of the invention, the step of providing the second message includes the steps of removing a first header from the first message, the first header having the first address, creating a second header having the second address and combining the second header with the data to form the second message.

In yet another embodiment of the invention the computational device runs a first operating system that provides a first operating system environment, wherein the virtual machine runs in the first operating system environment and provides at least one additional operating system environment that is different from the first operating system environment, and wherein the step of providing includes the step of sending at least one additional communications signal having at least one additional address and the data to an application running in the at least one additional operating system environment.

In another embodiment, a first content server runs in the first operating system environment, wherein a second content server runs in the second operating system environment, and wherein the method further comprises the steps of transferring a communication from the second content server to the first content server and moving content from both the first and second content servers to the external device in response to the second message.

In yet another embodiment, the virtual machine includes a virtual network interface, wherein the step of providing includes the step of transferring the data to the virtual machine through the virtual network interface.

In another embodiment, wherein, based upon determining whether to translate a first communication signal, the step of performing further includes optionally conducting the network address translation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for providing a network service to a virtual machine. According to an embodiment of the invention, an operating system running within a virtual machine hosts a desired application. A typical method for providing the virtual machine capability is to use a software package such as VMware™, a commercial software program used to emulate one or more subordinate computers capable of executing application programs. For example, VMware™ runs on a computer system using a so-called native Linux® operating system. In turn, the virtual computer environment running within the VMware™ program can be set up to provide a Windows NT® operating system. Then Microsoft Windows Media® Technology server can be executed within the Windows NT® operating system. Other programs can also be used to provide the virtual machine environment such as a Java® virtual machine. In addition, a second program, also running on the native operating system of the computer system (along with the virtual machine program) intercepts network traffic and translates the network addresses. The program translates the network addresses to internal IP addresses supported by one of the virtual machines, by using an associated port identifier. An example of one program that is capable of performing such translation is the ipchains program of the Linux® operating system. Data can then be forwarded to the particular virtual machine represented by the translated address.

Figure 1:
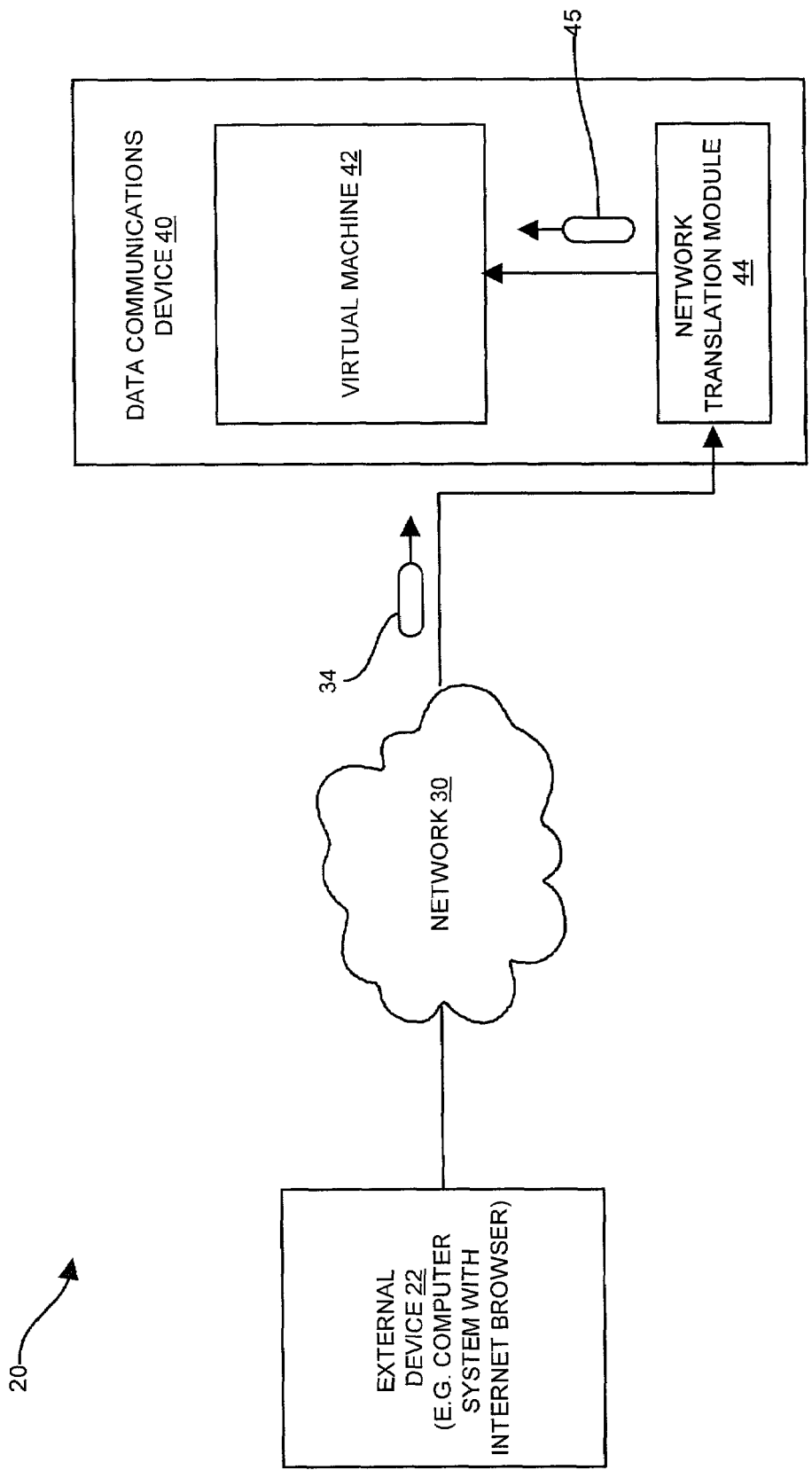
FIG. 1 shows a communications system which is suitable for use by the invention.

FIG. 1 shows a communications system 20 with components that are suitable for use by the invention. The system 20 includes an external device 22, a network 30, and a data communications device 40. The data communications device 40 includes a virtual machine 42 and a network address translation module 44.

The data communications device 40 is configured to receive and process data communications from the external device 22. At least some of the processing is performed by the virtual machine 42 operating on the data communications device 40. The external device 22 runs an application (e.g. an Internet browser) that can request content over the network 30. The Internet browser can be used to request data or other content from the data communications device 40 and display the data or content to the user upon receipt. Other computing devices may be used as external devices 22 as well, such as devices and systems containing software application clients, data collection devices, microprocessors, etc.

The external device 22 communicates over the network 30 with the communications device 40 by sending first communications signals or messages 34, such as requests for content or other commands. The network 30 may be a typical data communications network or any other facility for electronic transmission (e.g., the Internet). Within the data communications device 40, the network translation module 44 intercepts the first message 34. Upon receipt of the first message 34, the network translation module 44 uses information extracted from the first message 34 to translate a first address 74 (FIG. 3), provided by the first message 34, into an second address 82 (FIG. 3) identifying the virtual machine 42 as the intended recipient of the message. The network translation module 44 then forwards the first message 34 containing the translated address to the virtual machine 42.

Although the network translation module 44 can perform address translation, designers, users, etc. can also program the network translation module 44 in such a manner that it does not perform individual or multiple translations for selected first messages 34. Designers, users, etc. can use this technique to drop or filter out certain messages 45 from reaching a virtual machine 42 and the applications running within a virtual machine 48, 54 (See FIG. 2).

Figure 2:
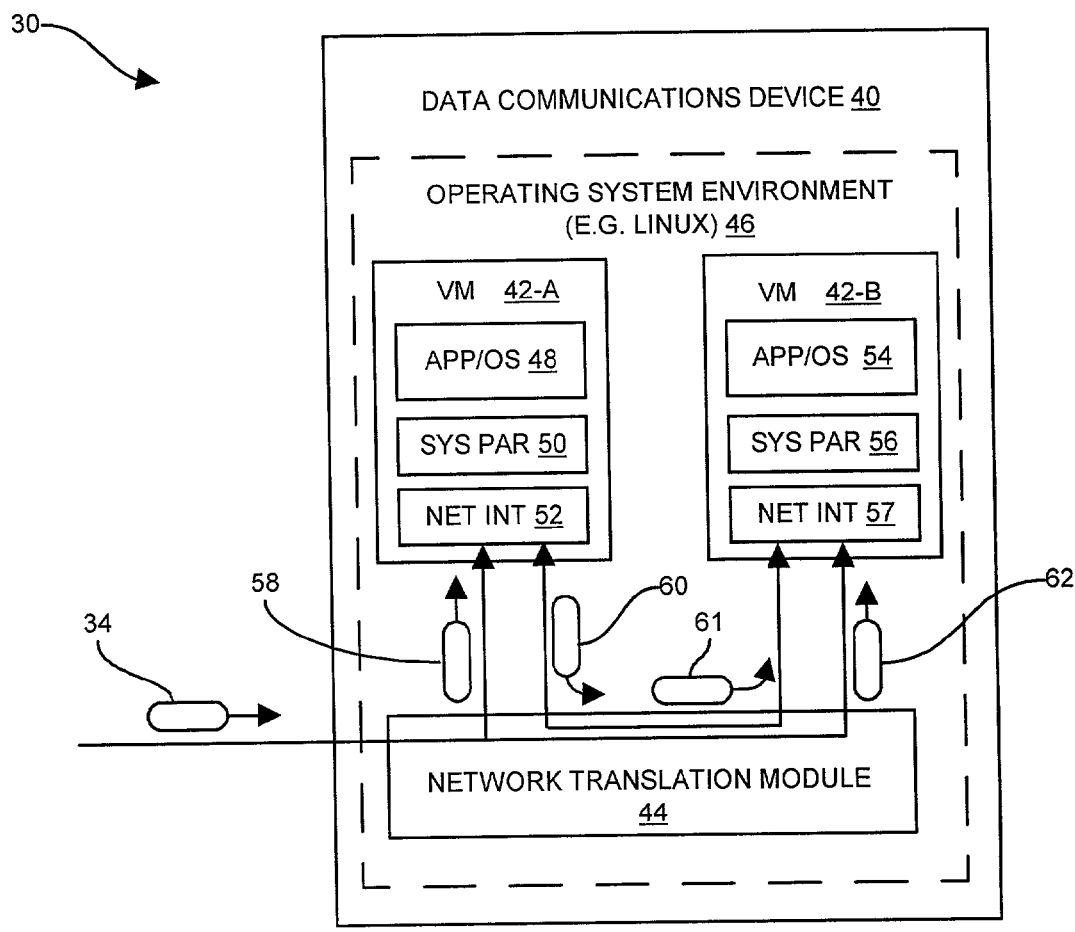
FIG. 2 shows a data communications device having a first operating system environment, virtual machines and a network translation module.

Further details of the invention will now be provided with reference to FIG. 2.

FIG. 2 shows further details of the data communications device 40 including the transmission of messages between the external device 22, network translation module 44 and virtual machines 42-A and 42-B. Accordingly, the data communications device 40 includes an operating system environment 46 with multiple virtual machines 42-A, 42-B (one being the virtual machine 42 shown in FIG. 1). Each virtual machine includes application programs and operating system programs 48, 54, systems parameters 50, 56, and network interfaces 52,57. The data communications device 40 operates on a series of messages: a first message 34 from the external device 22, messages 58, 62, transmitted from the network translation module 44 to virtual machines 42-A, 42-B, and a message 60 transmitted from one virtual machine 42-A to the network translation module 44 and in turn, transmitted through the network translation module 44, to another virtual machine 42-B.

The data communications device 40 receives a first message 34 from the external device 22 over the network 30. The data communications device 40 runs an operating system program in order to provide an operating system environment 46 such as, for example, Linux®, VMS®, Windows 2000®, Windows NT®, Unix®, etc. Other operating system programs may also be used to create an operating system environment 46. As such, the operating system environment 46 provides the operational functionality thought of as being native to a computer system or data communications device. This operational functionality includes the provision of a variety of processes that are needed by other operating system procedures and application software programs in order to operate.

One software program capable of operating within the operating system environment 46 is a virtual machine program 42-B (also see 42 in FIG. 1). When executed, a virtual machine program creates one or more other instances of virtual computers each having an operating system environment functioning within the native operating system environment 46 of the data communications device 40. For example, two instances of the other operating system environments created by execution of the virtual machine program are referred to as virtual machine 42-A, 42-B. They simulate operation of separate, complete computer systems with separately functioning operating systems.

In addition to the already mentioned virtual machine capabilities, virtual machines also provide virtual network interfaces 52, 57 in an analogous manner to those provided by single operating system communications devices or computers. Such virtual network interfaces 52, 57 can function by using software procedures rather than either hardware-performed or a software-hardware combination performed procedures as may be found in single operating system computers. The virtual network interfaces perform the functions that are similar to the single operating system computers such as communicating with other computational devices and computers attached to the network 30 or with other virtual machines, except that the operations can occur on one computational device.

The network translation module 44 is another software program that operates within the operating system environment 46 of the data communications device 40. It accepts a first message 34 containing a first address 74 (See FIG. 3), translates the first address 74 to a second (internal) address 82 (See FIG. 3) and forwards the second address 82 with the data 76 to the virtual machine designated by the second address 82. This process will be described in more detail later.

Messages 58 and 62 depict the transmission of messages to two different virtual machines 42-A and 42-B. The choice of depicting two virtual machines in FIG. 2, is by way of example only. It should be understood that either one or more than two virtual machines can also be configured within one native operating system of a communications device 40.

In addition to receiving a first message 34 from the external device 22, communications between virtual machines 42-A and 42-B within the data communications device 40 is also possible. Accordingly, message 60 depicts the generation and transmission of the first message 60 from virtual machine 42-A to virtual machine 42-B, in an analogous manner to the transmission of messages between an external device 22 and a virtual machine 42 operating on the data communications device 40. In similar fashion to what occurs in the case of a message being received from external device 22, the network translation module 44 translates the first address 74 sent to the network translation module 44, for example, into a second address for virtual machine 42-B, combines the second address with data 76 sent from virtual machine 42-A and forwards the combination 60 to virtual machine 42-B. Further details of the invention will now be provided with reference to FIG. 3.

Figures 3, 4:
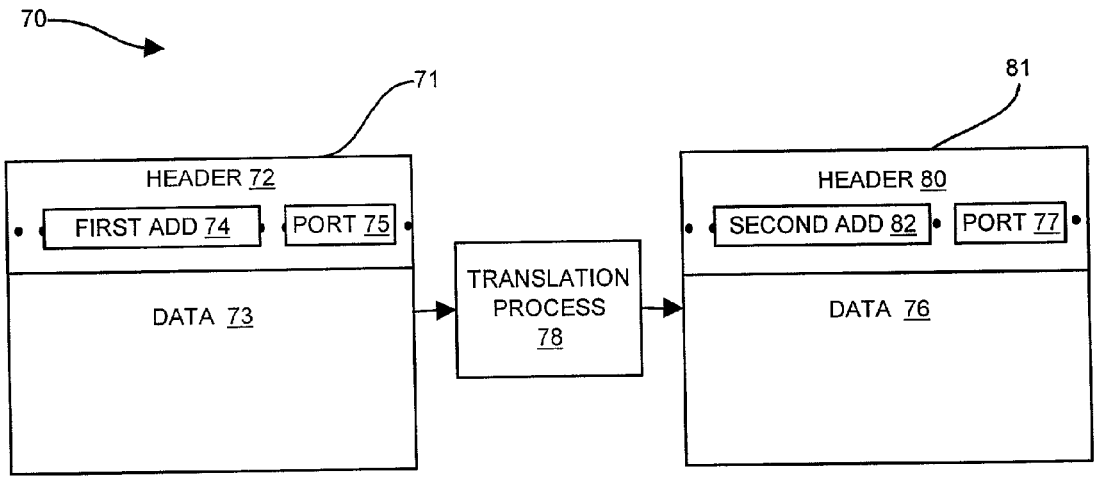
FIG. 3 shows a data communications signal or message with a header before and after translation.
FIG. 4 shows a table for using port identifiers to generate internal IP addresses.

FIG. 3 shows a message which is suitable for use by the system 20 of FIG. 1 before and after network address translation. The diagram of messages 70 includes a first message 71, with a header 72 having an first address 74 and port identifier 75, data 73, a translation process 78, a second message 81 with a header 80 having an second address 82 and port identifier 77, and data 76. The translation process entails creating a new message as a result of translating an external destination address to an internal destination address.

Upon receipt of the first message 71 from the external device 22, the network address translation module 44 reads the first address 74 and translates the first address 74 to an second address 82. The second address becomes part of the header 80 of the second message 81. In one embodiment of the invention, communication of the second message 81 involves replacing the first address 74 field in the first message 71 with the second address 82. In a different embodiment of the invention, the header 72 and data 73 components of the first message 71 are first separated from one another, a header 80 is created for the second message 81 including the second address 82, then the header 80 of the second message 81 and the data 76 are combined to create a new message 58 or 62.

It should be noted that standard IP packets are suitable for use as the first messages 71, 81. In particular, the first and second addresses 74, 82 can be source addresses of the IP packets, and the port identifier 75, 77 can be the port identifiers of the IP packets. Further details will now be provided with reference to FIG. 4.

FIG. 4 is a table 84 suitable for use in translating a first message 34 to a second message 58, 62. The table includes a column of port identifiers 85 and a column of internal destination addresses 86. Upon receipt of the first message 71 containing a first address 74, (designating the data communications device 40), the network translation module 44 conducts a translation 78. Accordingly, the network address translation module 44 locates a port identifier value from the table port column 85 equivalent to the port identifier 75 that appears in the first message 71. The network translation module 44 then selects the second address 82 corresponding to the located port identifier row in the internal destination address column 86 and uses that as the second address 82 of the second message 81. Details of the invention will now be provided with reference to FIG. 5.

Figure 5:
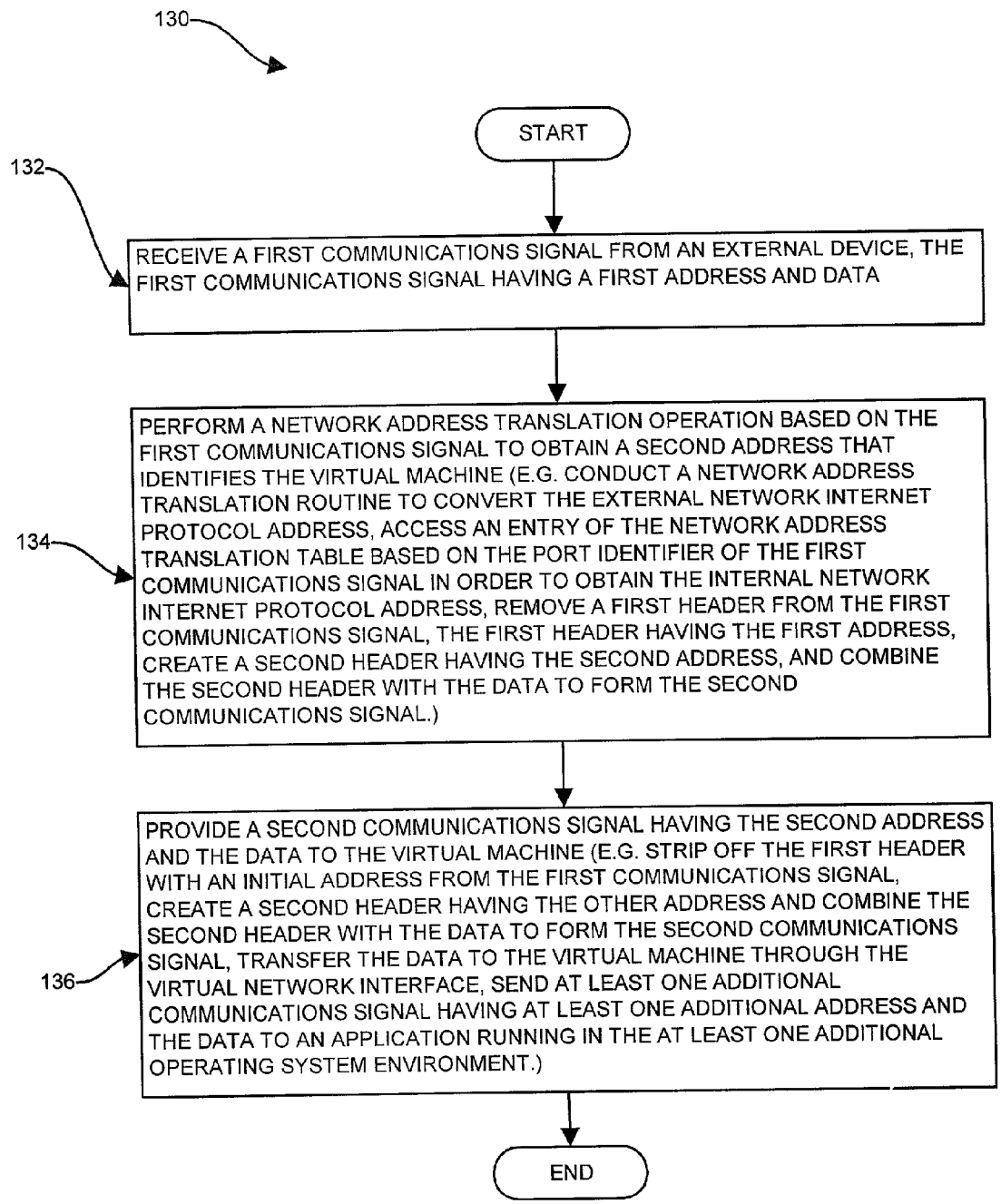
FIG. 5 shows a flow chart of a procedure for providing a network service to a virtual machine.

FIG. 5 is a flow chart of a procedure 130 for providing network communications services to a virtual machine, that is performed by the data communications device 40. In step 132, the data communications device 40 receives a first message 34 from the external device 22, the first message 34 having a first address 74 and data 73. Transmission of the first message 34 may be accomplished in different ways. A common way for the message to be transmitted from the external device 22 is over a TCP/IP network, used for the Internet. In the case of a TCP/IP network, for example, the first message 34 would be transmitted in the form of data packets. The pertinent part of such a data packet, offered as one example of a message, is depicted in FIG. 3. Other methods of transmission, different protocols, etc. are also possible.

In step 134, the network address translation module 44 performs a network address translation 78 operation based on the first message 34, to obtain a second address 82 that identifies the virtual machine 42. The network address translation module 44 can also perform network address translations to multiple virtual machines (e.g. 42-A, 42-B).

Different methods can be used to perform network address translation. According to one method, the network translation module 44 uses a network address translation routine 78 to convert the external network Internet protocol address (first address 74) to a second address 82. Another method is for the network translation module 44 to access an entry of a network address translation table 84. The network address translation table 84 uses a port identifier 75 of the first message 71 in order to obtain the internal network Internet protocol address 82 (second address). After that is done, the translation module can remove the first header 72 (which has the first address) from the first message 71, create a second header 80 having the second address 82, and combine the second header 80 with the data 76 to form a second message.

Once translation has been conducted, the network translation module 44 forwards the second message 81 having the second address 82 and data 76 to an application running in the second operating system environment, in this case either 42-A or 42-B.

A slightly different method for conducting the translation process is to strip header 72 from the message 71, create a second header 80, then use the second header 80 and data 76 to form a second message 81, as described earlier.

In step 136, the network address translation module 44 transmits the second message, either 58 or 62, (depending upon which virtual machine has been designated), having data 76 to either virtual machine 42-A or 42-B, through the virtual network interface, 52 or 57 to either virtual machine 42-A or 42-B and potentially any applications operating thereon.

The following example will help to provide an understanding of the procedure. Upon receipt of a first message 34, such as a TCP/IP protocol data transmission, by the data communications device 40, the network address translation module 44, receives the first message 34. In this example, where the first message 34 is provided in the form of a TCP/IP protocol, the first message 34 received by the data communications device 40, is in the form of data packets, of which a simplified example is provided in FIG. 3 showing parts of a packet 71, 81 that are pertinent to the invention.

Upon receipt of a first data message (e.g. packet) by the data communications device 40, the data message is forwarded to the network address translation module 44. The first address 74 of the first data message received is the IP address of the data communications device 40. It is the address used to route the first data message over the network to the data communications device 40. The header 72 also has an additional field containing a port identifier 75. A typical port identifier 75, for example might be 80, the port identifier used for the hypertext transport protocol.

Upon receiving the first data message, the network address translation module 44, in one embodiment of the invention, looks for a row (i.e., an entry) in the port identifier column 85 of the network address translation table 84 that has a port identifier entry of 80. In turn, the network address translation module 44, uses the IP address from the internal destination address column 86 of the port identifier row to derive the second address 82. Accordingly, using the network address table provided in FIG. 4 for this example, the IP address would be 23.146.101.46.

To complete the translation process 78, IP address 23.146.101.46 is entered into the second address field 82 of the translated message 81 and the port identifier 80 is entered into the port identifier field 77. After translation 78, the second message 81 is transmitted via the virtual machine network interface 52, 57 to the virtual machine designated with the internal IP address 23.146.101.46, for example virtual machine 42-A. Further details of the invention will now be provided with reference to FIG. 6.

Figure 6:
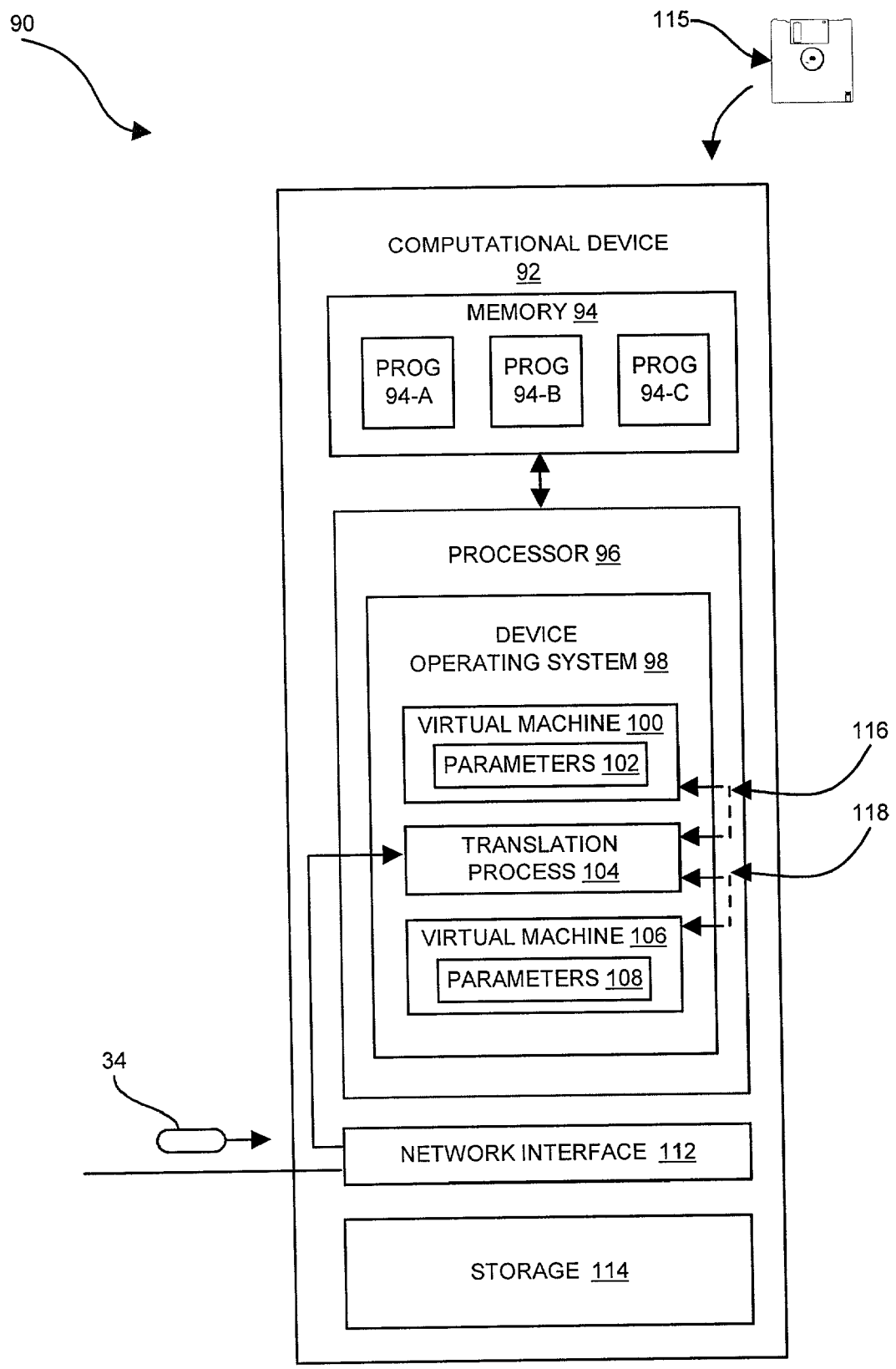
FIG. 6 shows a general purpose computer suitable for use by the invention.

FIG. 6 shows an embodiment of the invention in which the computational device 92 is implemented using a general purpose computer 90. The computational device 92 includes a memory 94, capable of storing programs such as 94-A, 94-B and 94-C, a processor 96, which has a device operating system 98, two virtual machines 100, 106 each having system parameters 102, 108, a translation process 104, a network interface 112, storage 114 and a computer readable medium 115. FIG. 6 also shows a first message 34 and communications 116, 118 between the translation process 104 and the virtual machines 100 and 106. The general purpose computer embodiment of the invention can provide functionality described earlier with respect to other embodiments of the invention.

Programs or portions of programs may be temporarily stored in memory 94 (e.g. 94-A, 94-B, 94-C) and transferred between memory 94 and the processor 96 to which the memory is coupled. The memory 94, for example, may store the virtual machine program, computational device operating system and application programs. The processor can process the device operating system 98, two instances of virtual machines 100 and 106 (two instances of virtual machines are shown by way of example only; either one instance or more than two instances of virtual machines are also possible), a translation process 104 as well as other application programs. Other combinations of programs or portions thereof may be stored in memory 94 and processed by the processor 96 as well. The general purpose computer also uses a network interface 112 to receive the first message 34 from an external device 22 (See FIG. 1) and transmit the first message 34 to the translation process 104 running on the processor. In addition, the general purpose computer has a storage module 114 for long-term storage of software and data.

The processes of receiving a first message, performing network address translation and providing a second message to a virtual machine are performed on a general purpose computer in the same manner as described in FIG. 5.

It is also possible for communications to exist between the two virtual machines 100 and 106. In order to do so, one virtual machine, virtual machine 100, for example, sends a message 116 to the translation process 104. Upon receipt by the translation process 104, the message 116 is translated in the same manner as translation performed for a first message 34 received from an external device 22 as described in FIGS. 1–3. After translation, the message 118 is transmitted to the other virtual machine 106.

Each of the virtual machines 100 and 106 are able to have system parameters 102 and 108 set, in order to control virtual machine, application, and computational device-related operations. Use of system parameters will be discussed in more detail later.

The general purpose computer 90 also includes a computer readable medium 115, capable of storing the programs described above for use on the general purpose computer 90. Further details of the invention will now be provided with reference to FIG. 7.

Figure 7:
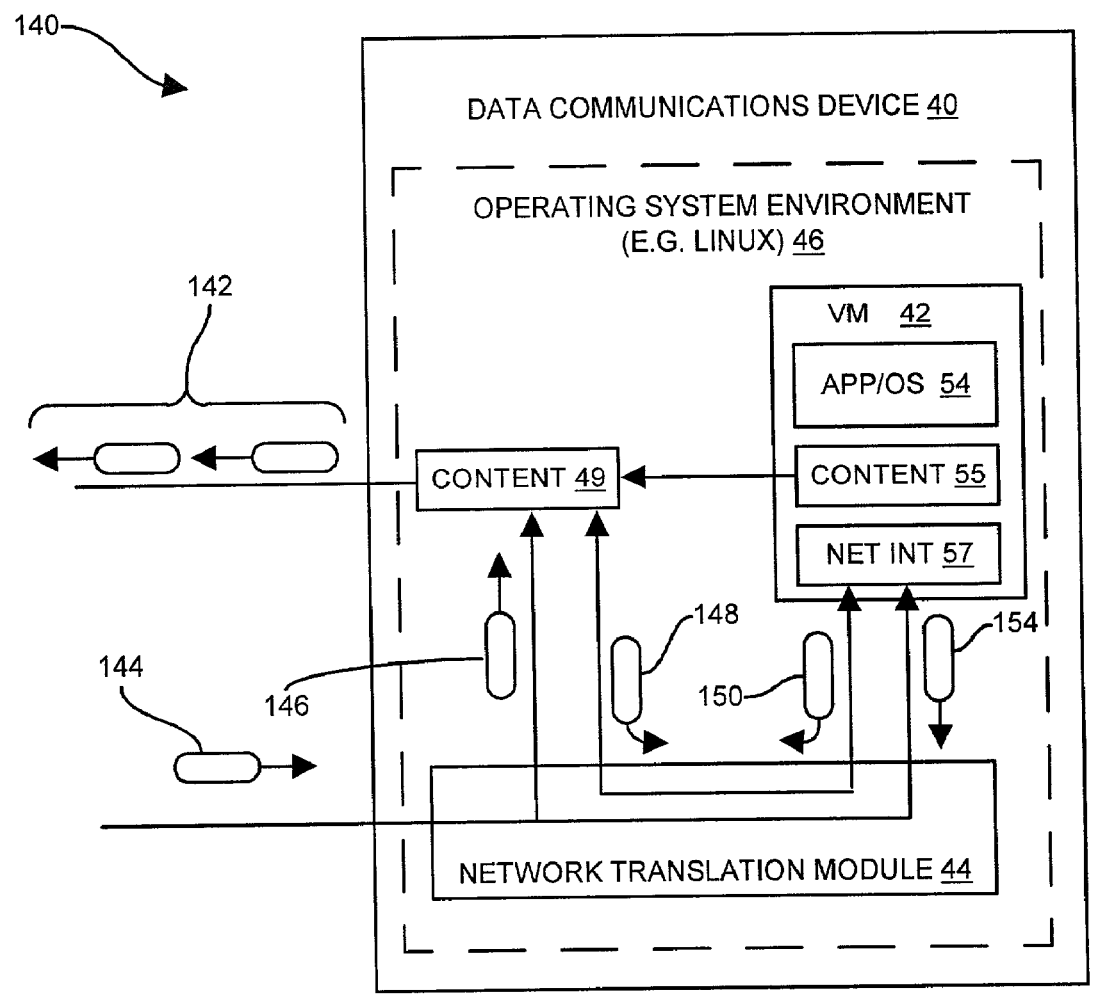
FIG. 7 shows an embodiment of the invention that depicts transmission of content from two different content severs in response to an initial user request for content.

FIG. 7 shows the data communications device 40 (also see FIG. 1) in which the virtual machine 42 runs a content server application that provides content (e.g. video content). This embodiment of the invention allows for co-location of multiple-content servers on a single computational device.

As shown, the data communications device 40 runs an operating system environment 46 (e.g. Linux). Within this operating system environment 46 also run a content server application 49, the virtual machine 42 and the network translation module 44. The virtual machine 42 (e.g. Windows® 2000) runs a content server application 55 and a logical network interface 57. In accordance with the use of a virtual machine program, the data communications device 40 provides the capability to run multiple operating system platforms (e.g. Linux, Windows® 2000) with a different content server on each operating system platform.

Since the data communications device 40 runs multiple content servers 49, 55, the data communications device 40 is equipped to provide different types of content from a single location. For example, an external device 22 (FIG. 1) can provide a single content request 144 to the data communications device 40. In one arrangement, the request 144 includes routing information (a first address, a port identifier, etc., see FIG. 3). The network translation module 44 can direct that request to the virtual machine 42 based on the routing information. The network interface 57, can, in turn, process the request and provide the request to the content server 55. In response, the content server 55 can provide the requested content 154 to the external device 22 (e.g. through the virtual network interface 57 and the network translation module 44).

In some situations (e.g. when the request is for a complete web page), the provided content may be incomplete. That is, there may also be a need for the content server 49 to provide content to the external device 22. In this situation, the content server 55 running within the virtual machine 42 can send a message 150 (via the network translation module 44) to the content server 49. In response, the content server 49 can provide additional content 142 to the external device 22 (e.g., through the network translation module 44). As such, the external device 22 does not need to send multiple requests, i.e. a request to each content source. Rather, the external device 22 can send the single request 144 and receive content from multiple sources 142+154.

It should be understood that, in the above-provided example, the external device 22 was described as providing the request 144 initially to the content server 55 running on the virtual machine 42, and the virtual machine 42 subsequently providing a message internally 150 to the content server 49 running in the native operating system environment 46 by way of example only. Alternatively, the external device 22 can provide the request 144 initially to the content server 49, and the content server 49 can provide a message 148 internally to the content server 55 running on the virtual machine 42 in order to fully satisfy the request 144.

Other arrangements are suitable as well. For example, one virtual machine 42 can provide content as well as messages to other virtual machines in response to a content request. For example, a content server running on the virtual machine 42-B of FIG. 2 can respond to a content request, and concurrently provide a message to another content server running on the virtual machine 42-A directing that other content server to provide additional content. Further details of the invention will now be provided with reference to FIG. 8.

Figure 8:
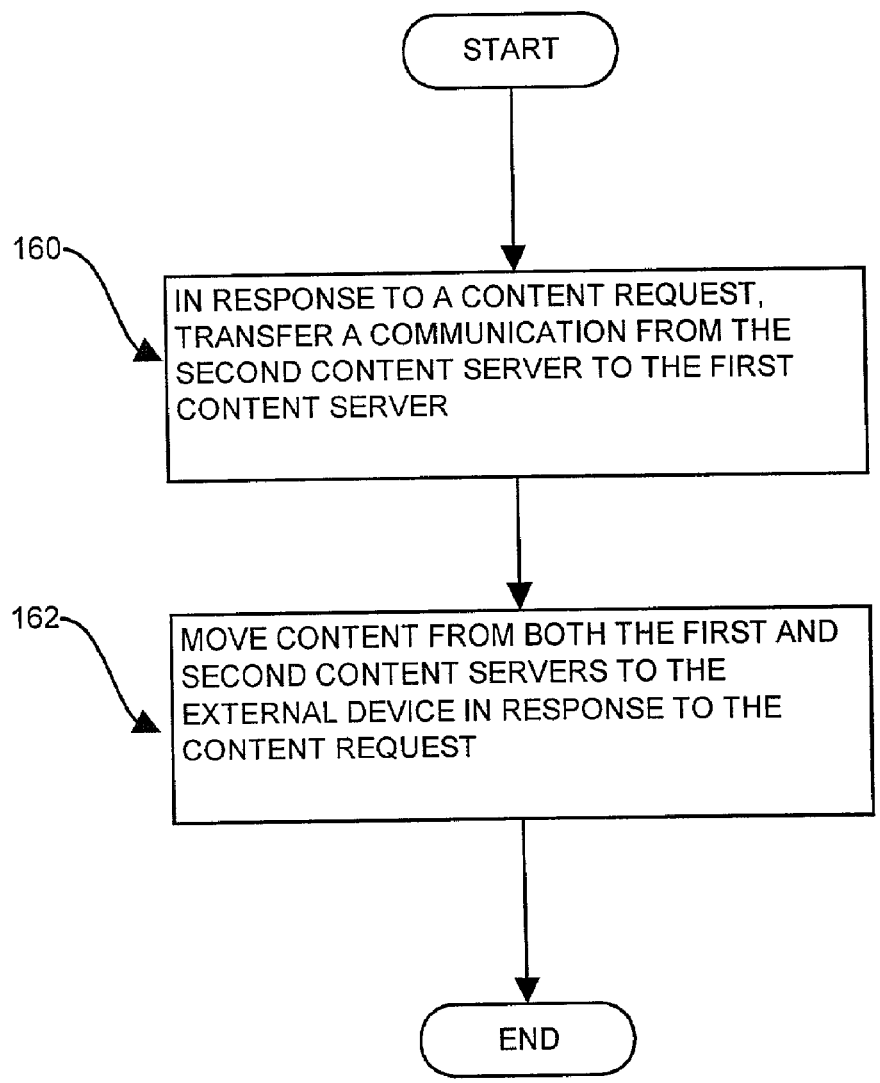
FIG. 8 shows a flow chart of a procedure for transmitting content from two different content servers to an external device.

FIG. 8 is a flow chart of a procedure for filling a content request with content obtained from two different content provider applications operating within different operating system environments on one computational device. In step 160, a communication 150 from the second content server 55 is forwarded to the first content server 49 in response to a content request 148. In step 162, the computational device 40 moves content 142 from both the first and second content servers (49 and 55) to the external device 22 in response to the content request 144.

One of the advantages of this arrangement is that the transmission time for different types of content that are located on the same computer can be reduced. For example, in a conventional arrangement, a user may request a web page from a content server located on the data communications device 40. Upon receiving the web page, additional content from other servers on the network may be required to complete the web page. Obtaining the additional content adds to transmission time.

However, if the content needed to fill the request for additional data can be located on the same computer, as can be accomplished by the embodiments of the invention described herein, transmission time is reduced. Accordingly, the web page requested from content server 49 can be configured to request the additional content from the second content server 55 located on the computer within virtual machine 42. In that situation, a message 148 requesting data is transmitted from the content server 49 directly to the content server 55 operating in the virtual machine 42. In turn, the combined content (142+154) from both servers 49 and 55 is returned to the external device 22. An explanation of one use of virtual machine system parameters will now be undertaken.

System parameters are one of the features of virtual machines (FIG. 2: 50,56; FIG. 6: 102, 108) that are used to control their operation. System parameters define such operational characteristics as memory and paging sizes, file space limitations, user control characteristics, system performance characteristics, etc., to name only a few. Typically, setting system operational parameters is a complex task involving advanced technical knowledge, intricate set-up procedures, extensive trial and error experimentation, etc. largely undertaken as part of the process of setting up new systems. It is an important step in setting up a virtual machine, as well.

It is possible to modify the procedure for defining system parameters so as to simplify the implementation of application programs requiring new virtual machine operating systems. To do so, a software application provider first identifies the optimal system parameter settings for effective operation of a particular target software application and operating system combination. This process involves the application of advanced system knowledge, implementation of intricate set-up procedures and some trial and error experimentation, as described earlier.

After defining an effective combination of system parameters that is capable of operating effectively for the selected application program and operating system combination, a system manufacturer's system manager then use one or a combination of several methods to duplicate and implement the same desired system parameters on a the new systems. The methods used for parameter duplication depend upon the methods available for parameter duplication for the particular virtual machines software program and operating system being used. In one case, for example, parameters may be duplicated by copying and replacing set-up and configuration files taken from the virtual machine sought to be duplicated. In another case, duplication of system parameters to new virtual machines may involve execution of script files designed to duplicate the system parameters on a newly manufactured virtual machine. Additional system parameter duplication methods such as disk duplication, automated set-up and others may also be utilized.

When used in this manner, virtual machine and application program installations can be simply manufactured, thereby reducing or eliminating complex set-up that would otherwise would be required by end-users. Manufacturing application and virtual machine combinations in this manner, makes feasible, user implementation of application programs requiring new operating system platforms that otherwise would not be technically possible.

As described above, the invention is directed to techniques for providing a network service to a virtual machine. According to the embodiments of the invention, a desired application program is hosted on an operating system running within a virtual machine. A typical method for providing the virtual machine capability is the use of software packages such as VMware™, a commercial software program used to emulate one or more subordinate computers capable of executing application programs. Other programs can also be used to provide the virtual machine environment such as a Java® virtual machine. Features of the invention may be particularly useful in computerized devices manufactured by Cisco Systems, Inc. of San Jose, Calif.

In order to communicate between software applications being executed within one or more virtual machines and an outside location, the network traffic is intercepted and network addresses are translated. This is accomplished by a second program, also running on the native operating system of the computer system (along with the virtual machine program). The program accepts requests from the outside source and translates them to an internal IP address supported by one of the virtual machines, using an associated port identifier. An example of one program that is capable of performing such translation is the ipchains program of the Linux® operating system. Data can then be provided by the virtual machine of the translated address.

While this invention has been particularly shown and described with references to preferred embodiments thereof, it will be understood by those skilled in the art that various changes in form and details may be made therein without departing from the spirit and scope of the invention as defined by the appended claims.

For example, both the external device 22 and data communications device 40, may be any kind of device capable of generating, receiving or processing a request. These may include large and small computers and systems, other digital and electronic devices, etc. In addition, the invention may operate on computer systems or other devices which do not contain all of the components described herein. For example, an external device 22 or data communications device 40, instead of being a fully equipped computer, could be a smaller device using only random access memory to store software programs instead of permanent media storage. Other examples are devices that perform some functions using electronic or other hardware to perform operations that might otherwise be controlled by software.

A typical data communications network includes many hosts interconnected by various communications devices such as routers, bridges, switches, access servers, gateways, hubs, concentrators, proxy servers, repeaters and so forth which exchange data over an interconnection of data links. Connections may include physical or wireless connections, such devices as modems, transceivers, network interface cards, fiber optic cards, ports, facilities such as T1, fractional-T1, or simple wire connections, etc. that allow the propagation of data between the various devices and hosts.

Communications signals (messages) and communications of the various embodiments of the invention may use other protocols or other methodologies, hardware, software, etc. besides those described and/or used as examples herein. Functions described herein may be performed by a variety of software systems, programs, routines and/or functions, etc. including but not limited to various other operating systems, browser, and Internet communications programs and systems, translation and communications programs such as firewall-related software, content provision, Internet server software, etc.

What is claimed is:

1. In a computational device, a method for providing a network service to a virtual machine, the method comprising the steps of:

running a native operating system and running a virtual machine environment operating system on the native operating system, the virtual machine environment operating system being different than said native operating system;

receiving a first communications signal from an external device, the first communications signal having a first address and data;

performing a network address translation operation based on the first communications signal to obtain a second address that identifies the virtual machine environment operating system; and providing, to the virtual machine, a second communications signal having the second address and the data;

wherein a first content server runs in the virtual machine environment operating system, wherein a second content server runs in native operating system, and wherein the method further comprises:

transferring a communication from the second content server to the first content server, and moving content from both the first and second content servers to the external device in response to the second communications signal.

2. The method of claim 1 wherein the computational device connects with the external device through an external network, wherein the first address is an external network Internet Protocol address, wherein the virtual machine resides in an internal network within the computational device, wherein the second address is an internal network Internet Protocol address, and wherein the step of performing includes the step of:

conducting a network address translation routine to convert the external network Internet Protocol address to the internal network Internet Protocol address.

3. The method of claim 2 wherein the computational device includes a network address translation table, wherein the first communications signal further includes a port identifier, and wherein the step of conducting includes the step of:

accessing an entry of the network address translation table based on the port identifier of the first communications signal in order to obtain the internal network Internet Protocol address.

4. The method of claim 1 wherein the step of providing the second communications signal includes the steps of:

removing a first header from the first communications signal, the first header having the first address;

creating a second header having the second address; and combining the second header with the data to form the second communications signal.

5. The method of claim 1 wherein the virtual machine includes a virtual network interface, and wherein the step of providing includes the step of:

transferring the data to the virtual machine through the virtual network interface.

6. The method of claim 1 wherein, based upon identifying a second communications signal that will not be provided to the virtual machine, the step of receiving further includes the step of:

discarding the first communications signal.

7. A computational device comprising:

a network interface that is capable of coupling to an external device;

memory that stores a control application; and a processor coupled to the network interface and the memory, wherein said processor runs a native operating system and runs a virtual machine environment operating system on the native operating system, the virtual machine environment operating system being different than said native operating system, and wherein when (i) the processor operates in accordance with the control application, (ii) the processor runs the virtual machine, and (iii) the network interface couples to the external device, the processor is configured to:

receive a first communications signal from the external device, the first communications signal having a first address and data, perform a network address translation operation based on the first communications signal to obtain a second address that identifies the virtual machine environment operating system, and provide, to the virtual machine, a second communications signal having the second address and the data, wherein the computational device runs a first operating system to Provide a first operating system environment, wherein the controller, to provide at least one additional communications signal, is configured to:

send at least one additional communications signal having at least one additional address and the data to an application running in the at least one additional operating system environment, wherein a first content server runs in the first operating system environment, wherein a second content server runs in the second operating system environment, and wherein the controller, obtain content, is configured to:

transfer a communication from the second content server to the first content server; and move content from both the first and second content servers to the external device in response to obtain the second communications signal.

8. The computational device of claim 7 wherein the first address is an external network Internet Protocol address, wherein the virtual machine resides in an internal network within the computational device, wherein the second address is an internal network Internet Protocol address, and wherein the processor, to perform the network address translation, is further configured to:

conduct a network address translation routine to convert the external network Internet Protocol address to the internal network Internet Protocol address.

9. The computational device of claim 8 wherein the computational device includes a network address translation table, wherein the first communications signal further includes a port identifier, and wherein the processor, to perform the network address translation, is configured to:

access an entry of the network address translation table based on the port identifier of the first communications signal in order to obtain the internal network Internet Protocol address.

10. The computational device of claim 7 wherein the controller, to provide the second communications signal, is configured to:

remove a first header from the first communications signal, the first header having the first address;

create a second header having the second address; and combine the second header with the data to form the second communications signal.

11. The computational device of claim 7 wherein the virtual machine includes a virtual network interface, and wherein the controller, to provide content, is configured to:

transfer the data to the virtual machine through the virtual network interface.

12. The computational device of claim 7 wherein the virtual machine, based upon determining whether to translate a first communication signal, is further configured to:

optionally conduct the network address translation.

13. The computational device of claim 7 which further includes system parameters that are capable of controlling operation of a second operating system upon installation of the second operating system, wherein the second operating system is capable of running at least one application program, and wherein the processor, to send the second communications signal to the applications, is configured to:
use a pre-determined set of system parameters upon installation of the second operating system.

14. A computer program product that includes a computer readable medium having instructions stored thereon such that the instructions, when carried out by a computer running a native operating system, cause the computer to perform the steps of:
running a native operating system and running a virtual machine environment operating system on the native operating system, the virtual machine environment operating system being different than said native operating system;
receiving a first communications signal from an external device, the first communications signal having a first address and data;
performing a network address translation operation based on the first communications signal to obtain a second address that identifies the virtual machine environment operating system different than said native operating system; and
providing, to the virtual machine, a second communications signal having the second address and the data;
wherein a first content server runs in the virtual machine environment operating system, wherein a second content server runs in native operating system, and wherein the method further comprises:
transferring a communication from the second content server to the first content server, and
moving content from both the first and second content servers to the external device in response to the second communications signal.

15. A computational device, comprising:
a network interface to communicate with at least one external device;
a processor to manipulate data received, the processor running a native operating system for running a virtual machine environment operating system different than said native operating system, capable of providing a network service to a virtual machine process; and
coupled to the network interface and the processor, means to receive a first communications signal from an external device, the first communications signal having data;
means to identify the virtual machine as a destination for the data; and
means to provide a second communications signal having the data to the virtual machine;
wherein a first content server runs in the virtual machine environment operating system, wherein a second content server runs in the native operating system, and wherein the device further comprises:
means for transferring a communication from the second content server to the first content server, and
means for moving content from both the first and second content servers to the external device in response to the second communications signal.

16. The method of claim 1 wherein the computational device connects with the external device through an external network, wherein the first address is an external network Internet Protocol address, wherein the virtual machine resides in an internal network within the computational device, wherein the second address is an internal network Internet Protocol address, and wherein the step of performing includes the step of conducting a network address translation routine to convert the external network Internet Protocol address to the internal network Internet Protocol address;
wherein the first communications signal further includes a port identifier, and wherein the step of conducting includes the step of accessing an entry of the network address translation table based on the port identifier of the first communications signal in order to obtain the internal network Internet Protocol address;
wherein the step of providing the second communications signal includes the steps of:
removing a first header from the first communications signal, the first header having the first address;
creating a second header having the second address; and
combining the second header with the data to form the second communications signal;
wherein the step of providing includes the step of sending at least one additional communications signal having at least one additional address and the data to at least one application running in the at least one additional operating system environments;
wherein a first content server runs in the first operating system environment, wherein a second content server runs in the second operating system environment, and wherein the method further comprises the steps of:
transferring a communication from the second content server to the first content server; and
moving content from both the first and second content servers to the external device in response to the second communications signal;
wherein the virtual machine includes a virtual network interface, and
wherein the step of providing includes the step of:
transferring the data to the virtual machine through the virtual network interface; and
wherein, based upon identifying a second communications signal that will not be provided to the virtual machine, the step of receiving further includes the step of discarding the first communications signal.

17. The computational device of claim 7 wherein the first address is an external network Internet Protocol address, wherein the virtual machine resides in an internal network within the computational device, wherein the second address is an internal network Internet Protocol address, and wherein the processor, to perform the network address translation, is further configured to conduct a network address translation routine to convert the external network Internet Protocol address to the internal network Internet Protocol address;
wherein the computational device includes a network address translation table, wherein the first communications signal further includes a port identifier, and wherein the processor, to perform the network address translation, is configured to access an entry of the network address translation table based on the port identifier of the first communications signal in order to obtain the internal network Internet Protocol address;
wherein the controller, to provide the second communications signal, is configured to:
remove a first header from the first communications signal, the first header having the first address;
create a second header having the second address; and
combine the second header with the data to form the second communications signal;
wherein the controller, to provide at least one additional communications signal, is configured to send at least one additional communications signal having at least one additional address and the data to an application running in the at least one additional operating system environment;
wherein a first content server runs in the first operating system environment, wherein a second content server runs in the second operating system environment, and wherein the controller, obtain content, is configured to:
transfer a communication from the second content server to the first content server; and
move content from both the first and second content servers to the external device in response to obtain the second communications signal;
wherein the virtual machine includes a virtual network interface, and wherein the controller, to provide content, is configured to transfer the data to the virtual machine through the virtual network interface;
wherein the virtual machine, based upon determining whether to translate a first communication signal, is further configured to optionally conduct the network address translation; and
wherein said computational device further includes system parameters that are capable of controlling operation of a second operating system upon installation of the second operating system, wherein the second operating system is capable of running at least one application program, and wherein the processor, to send the second communications signal to the applications, is configured to use a pre-determined set of system parameters upon installation of the second operating system.

18. The computer program product of claim 14 wherein the instructions further cause the computational device to perform the steps of:
connecting with the external device through an external network, wherein the first address is an external network Internet Protocol address, wherein the virtual machine resides in an internal network within the computational device, wherein the second address is an internal network Internet Protocol address;
wherein the step of performing includes the step of conducting a network address translation routine to convert the external network Internet Protocol address to the internal network Internet Protocol address;
wherein the first communications signal further includes a port identifier,
and wherein the step of conducting includes the step of accessing an entry of the network address translation table based on the port identifier of the first communications signal in order to obtain the internal network Internet Protocol address;
wherein the step of providing the second communications signal includes the steps of:
removing a first header from the first communications signal, the first header having the first address;
creating a second header having the second address; and
combining the second header with the data to form the second communications signal;
wherein the step of providing includes the step of sending at least one additional communications signal having at least one additional address and the data to at least one application running in the at least one additional operating system environments;
wherein a first content server runs in the first operating system environment, wherein a second content server runs in the second operating system environment, and wherein the method further comprises the steps of:
transferring a communication from the second content server to the first content server; and
moving content from both the first and second content servers to the external device in response to the second communications signal;
wherein the virtual machine includes a virtual network interface, and
wherein the step of providing includes the step of:
transferring the data to the virtual machine through the virtual network interface; and
wherein, based upon identifying a second communications signal that will not be provided to the virtual machine, the step of receiving further includes the step of discarding the first communications signal.

19. The computational device of claim 15 wherein the first address is an external network Internet Protocol address, wherein the virtual machine resides in an internal network within the computational device, wherein the second address is an internal network Internet Protocol address, and wherein the processor, to perform the network address translation, is further configured to conduct a network address translation routine to convert the external network Internet Protocol address to the internal network Internet Protocol address;
wherein the computational device includes a network address translation table, wherein the first communications signal further includes a port identifier, and wherein the processor, to perform the network address translation, is configured to access an entry of the network address translation table based on the port identifier of the first communications signal in order to obtain the internal network Internet Protocol address;
wherein the controller, to provide the second communications signal, is configured for:
means to remove a first header from the first communications signal, the first header having the first address;
means for creating a second header having the second address; and
means for combining the second header with the data to form the second communications signal;
wherein the controller, to provide at least one additional communications signal, is configured to send at least one additional communications signal having at least one additional address and the data to an application running in the at least one additional operating system environment;
wherein a first content server runs in the first operating system environment, wherein a second content server runs in the second operating system environment, and wherein the controller, obtain content, is configured for:
means for transferring a communication from the second content server to the first content server; and
means for moving content from both the first and second content servers to the external device in response to obtain the second communications signal;
wherein the virtual machine includes a virtual network interface, and wherein the controller, to provide content, is configured to transfer the data to the virtual machine through the virtual network interface;
wherein the virtual machine, based upon determining whether to translate a first communication signal, is further configured to optionally conduct the network address translation; and
wherein said computational device further includes system parameters that are capable of controlling operation of a second operating system upon installation of the second operating system, wherein the second operating system is capable of running at least one application program, and wherein the processor, to send the second communications signal to the applications, is configured to use a pre-determined set of system parameters upon installation of the second operating system.

20. The method of claim 1, wherein receiving comprises receiving, by the native operating system, the first communications signal from an external device, the first communications signal having the first address and data.

21. The method of claim 1, wherein running a virtual machine environment operating system on the native operating system comprises running a first virtual machine environment operating system and a second virtual machine environment operating system on the native operating system, the first virtual machine environment operating system being different than the second operating system environment.

22. The method of claim 1, wherein the computational device comprises a single network address that identifies the native operating system on a network.

23. The method of claim 1 wherein:
receiving comprises receiving a single content request from the external device, the single content request having the first address and data; and
moving content comprises:
sending a first content portion, by the first content server through the computational device, to the external device in response to the single content request; and
sending a second content portion, by the second content server through the computational device, to the external device in response to the single content request, the first content portion and the second content portion forming a collective response to the single content request.

24. The method of claim 23, further comprising detecting, by the second content server, presence of the first content portion, the first content portion forming part of the collective response to the single content request and wherein:
transferring comprise transferring the communication from the second content server to the first content server, the communication indicating the first portion forms part of the collective response to the single content request; and
moving comprises moving, in response to the single content request and the communication from the first content server to the second content server, content from both the first and second content servers to the external device in response to the second communications signal.

* * * * *